J. N. B. BOND.
Hoisting Apparatus.

No. 135,513.  Patented Feb. 4, 1873.

Witnesses.  Inventor.

UNITED STATES PATENT OFFICE.

JOSEPH N. B. BOND, OF NEW YORK, N. Y.

IMPROVEMENT IN HOISTING APPARATUS.

Specification forming part of Letters Patent No. 135,513, dated February 4, 1873.

*To all whom it may concern:*

Be it known that I, JOSEPH N. B. BOND, of the city, county, and State of New York, have invented a new and Improved Hoisting Apparatus; and I do hereby declare the following to be a full, clear, and exact description thereof, which will enable those skilled in the art to make and use the same, reference being had to the accompanying drawing forming part of this specification, in which drawing—

Figure 1:
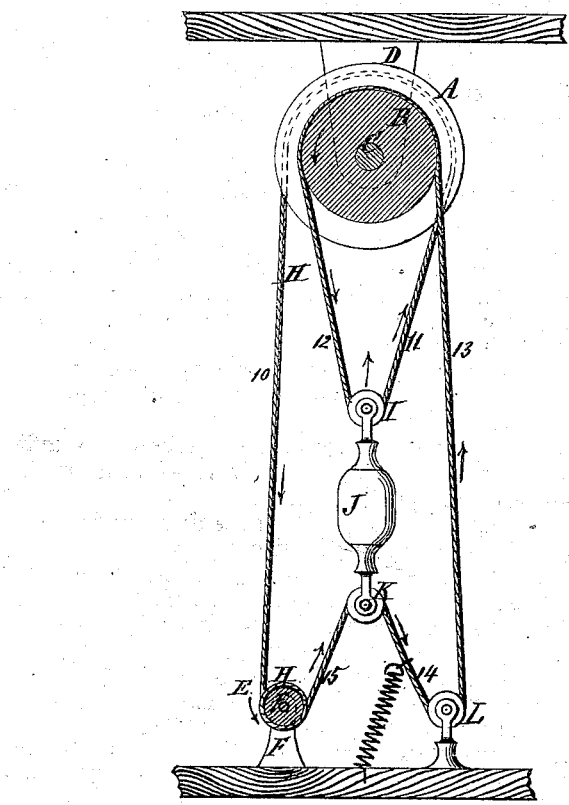
Figure 2:
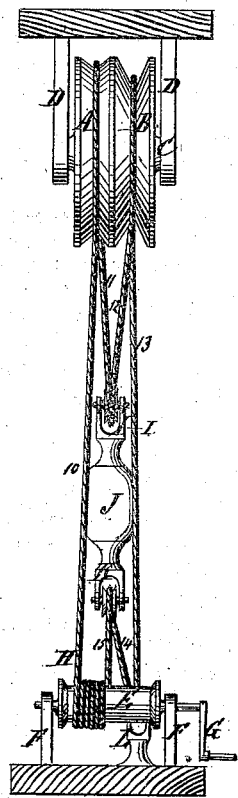

Figure 1 represents a sectional front view of my invention. Fig. 2 is an end view of the same.

Similar letters indicate corresponding parts.

This invention consists in the combination of a tightening device with an endless rope that runs over a differential or double-speed pulley, and through sheaves connected to the tightening device, in such a manner that, when the rope is moved by turning the windlass or by a direct strain, the tightening device rises with a slow and powerful motion, and vice versa, while the rope is always kept tight, or the tightening device acts as an automatic brake, retaining the double-speed pulley in any position into which the same may be brought, and against any strain to which the same may be subjected.

In the drawing, the letters A B designate the differential pulleys, the diameters of which differ from each other more or less, according to the power which it is desired to produce. This pulley is mounted on a shaft, C, which has its bearings in hangers D D, and it operates in conjunction with a windlass, E, which has its bearings in two standards, F, and to which motion is imparted by a hand-crank, G, or by any other suitable means. With the windlass and the differential pulley is combined an endless rope, H, that extends from the windlass over the large speed A of the pulley; thence down under a sheave, I, which is secured to the top of the tightening device J, and from this sheave the rope passes up over the small speed B of the pulley; thence down under a sheave, L, secured in the floor or bed of the apparatus; thence up over a sheave, K, secured to the lower end of the tightening device, and finally back to the windlass.

If the windlass is turned in the direction of the arrow marked near it in Fig. 1, the differential pulley turns in the direction of the arrow marked thereon; and if for each revolution of this pulley the strands 10 and 11 of the rope, the motion of which depends upon the larger differential pulley A, move faster, the strands 12 and 13, which derive their motion from the smaller differential pulley B, move slower, and, consequently, the tightening device has to rise in order to compensate for the difference in the motions of the strands 11 and 12. At the same time the same difference exists between the motions of the strands 14 and 15 of the rope, but the upward motion of the tightening device compensates for this difference, and the rope is always kept tight.

If desired a spring or any other suitable device may be brought to bear upon either of the strands of the endless rope to keep the same taut.

By thus combining a windlass with a differential pulley, a hoisting apparatus of very great power is obtained.

By combining the tightening device J with the windlass and with the pulley A B, this pulley is retained in any position in which it may be brought, and if the shaft C of said pulley is connected directly with an elevator or other hoisting mechanism, said elevator will be retained in any position in which it may be brought without requiring any brake. In this case the two speeds of the pulley A B may be made of the same diameter, and the tightening device takes the place of a permanent self-acting brake.

What I claim as new, and desire to secure by Letters Patent, is—

The combination of a tightening device, J, with pulleys A B and an endless rope or chain, H, a sheave, L, and a drum, E, the whole being constructed and operating substantially in the manner herein shown and described.

JOSEPH N. B. BOND.

Witnesses:
  W. HAUFF,
  E. F. KASTENHUBER.